United States Patent
Neafsey et al.

(10) Patent No.: US 9,312,926 B2
(45) Date of Patent: Apr. 12, 2016

(54) SYSTEM AND METHOD FOR NFC PEER-TO-PEER AUTHENTICATION AND SECURE DATA TRANSFER

(71) Applicant: Schlage Lock Company LLC, Indianapolis, IN (US)

(72) Inventors: Jeffrey Scott Neafsey, Golden, CO (US); Michael William Malone, Boulder, CO (US); Hamid Abouhashem, Lafayette, CO (US)

(73) Assignee: Schlage Lock Company LLC, Indianapolis, IN (US)

( * ) Notice: Subject to any disclaimer, the term of this patent is extended or adjusted under 35 U.S.C. 154(b) by 0 days.

(21) Appl. No.: 14/175,562

(22) Filed: Feb. 7, 2014

(65) Prior Publication Data

US 2014/0219453 A1   Aug. 7, 2014

Related U.S. Application Data

(60) Provisional application No. 61/881,329, filed on Sep. 23, 2013, provisional application No. 61/862,423, filed on Aug. 5, 2013, provisional application No. 61/762,150, filed on Feb. 7, 2013.

(51) Int. Cl.

| | |
|---|---|
| *G06F 21/43* | (2013.01) |
| *H04B 5/00* | (2006.01) |
| *H04W 4/00* | (2009.01) |
| *H04W 12/04* | (2009.01) |
| *H04W 12/06* | (2009.01) |
| *G06F 21/35* | (2013.01) |
| *G06F 21/62* | (2013.01) |
| *G06Q 20/32* | (2012.01) |

(52) U.S. Cl.
CPC .............. *H04B 5/0056* (2013.01); *G06F 21/35* (2013.01); *G06F 21/43* (2013.01); *G06F 21/6236* (2013.01); *H04W 4/008* (2013.01); *H04W 12/04* (2013.01); *H04W 12/06* (2013.01); *G06Q 20/3278* (2013.01); *H04L 2463/061* (2013.01)

(58) Field of Classification Search
None
See application file for complete search history.

(56) References Cited

U.S. PATENT DOCUMENTS

| | | | |
|---|---|---|---|
| 2004/0128500 A1* | 7/2004 | Cihula | G06F 21/34 713/155 |
| 2006/0213972 A1* | 9/2006 | Kelley et al. | 235/380 |
| 2008/0065877 A1 | 3/2008 | Son et al. | |
| 2010/0266132 A1 | 10/2010 | Bablani et al. | |
| 2011/0035604 A1* | 2/2011 | Habraken | 713/193 |
| 2011/0215159 A1 | 9/2011 | Jain | |

(Continued)

FOREIGN PATENT DOCUMENTS

EP    2263361 B1    11/2012

OTHER PUBLICATIONS

International Search Report and Written Opinion, May 30, 2014, pp. 1-7, International Patent Application No. PCT/US2014/015730, International Searching Authority, Virginia.

*Primary Examiner* — David Pearson
(74) *Attorney, Agent, or Firm* — Taft Stettinius & Hollister LLP

(57) ABSTRACT

A reader device may generate a first identifier. The reader device may transmit the first identifier to a mobile device. The reader device may receive encrypted data and unencrypted data from the mobile device in which the encrypted data includes a second identifier. The reader device may evaluate whether the first identifier and the second identifier correspond to one another.

20 Claims, 4 Drawing Sheets

(56) References Cited

U.S. PATENT DOCUMENTS

| | | |
|---|---|---|
| 2012/0011572 A1 | 1/2012 | Chew et al. |
| 2012/0042371 A1* | 2/2012 | Gur ................... G06Q 10/02 726/9 |
| 2012/0233687 A1 | 9/2012 | Metivier et al. |
| 2012/0280783 A1 | 11/2012 | Gerhardt et al. |
| 2012/0280790 A1 | 11/2012 | Gerhardt et al. |
| 2012/0324242 A1 | 12/2012 | Kirsch |
| 2013/0007849 A1 | 1/2013 | Coulter et al. |
| 2013/0331063 A1* | 12/2013 | Cormier et al. ............... 455/411 |
| 2014/0298016 A1* | 10/2014 | Ekberg et al. ................. 713/168 |
| 2014/0357187 A1* | 12/2014 | Ehrensvard ......... H04L 63/0838 455/41.1 |

* cited by examiner

SYSTEM AND METHOD FOR NFC PEER-TO-PEER AUTHENTICATION AND SECURE DATA TRANSFER

CROSS-REFERENCE TO RELATED APPLICATIONS

The present application claims the benefit of U.S. Provisional Patent Application No. 61/881,329, filed on Sep. 23, 2013, U.S. Provisional Patent Application No. 61/862,423, filed on Aug. 5, 2013, and U.S. Provisional Patent Application No. 61/762,150, filed on Feb. 7, 2013, all of which are hereby incorporated by reference in their entirety.

BACKGROUND

The present invention generally relates to authentication and secure data transfer of information such as credentials. Credentials may be used in various systems and transferred between devices in various ways. Some existing systems have various shortcomings relative to certain applications. Accordingly, there remains a need for further contributions in this area of technology.

SUMMARY

One embodiment of the present invention is a unique system and method for authentication and secure data transfer. Other embodiments include apparatuses, systems, devices, hardware, methods, and combinations for authenticating and securely transferring data. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION OF EXEMPLARY EMBODIMENTS

Figure 1:
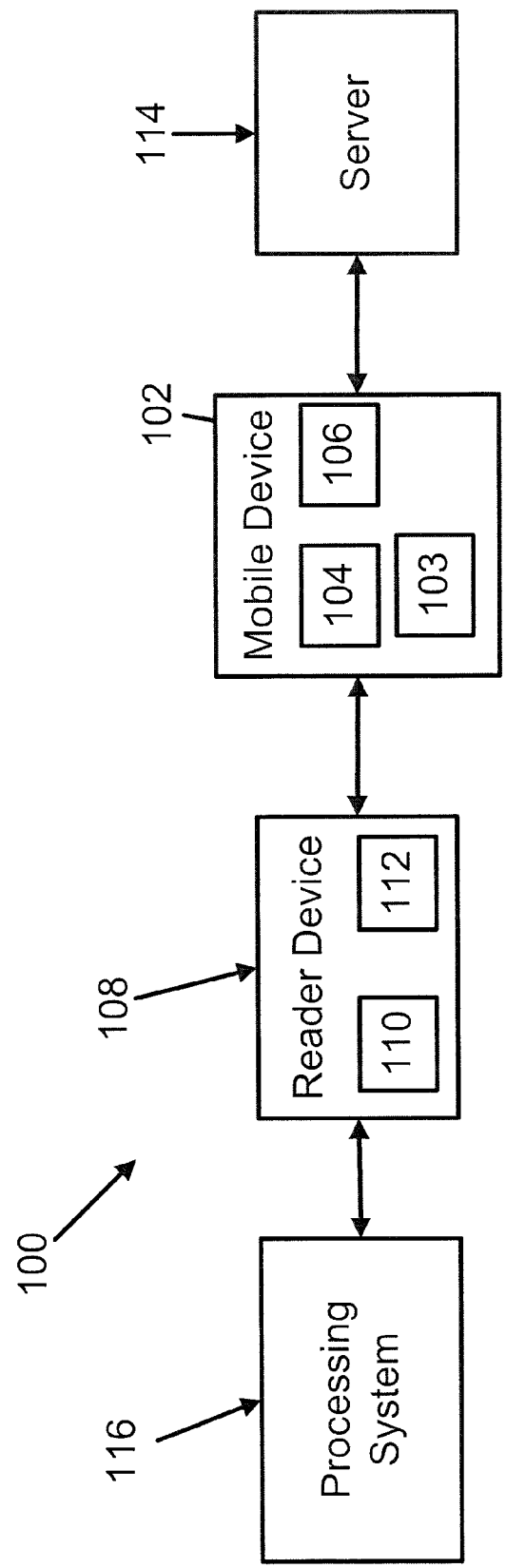
FIG. 1 is a schematic block diagram of an exemplary system.

For the purposes of promoting an understanding of the principles of the invention, reference will now be made to the embodiments illustrated in the drawings and specific language will be used to describe the same. It will nevertheless be understood that no limitation of the scope of the invention is hereby intended. Any alterations and further modifications in the described embodiments, and any further applications of the principles of the invention as described herein are contemplated as would normally occur to one skilled in the art to which the invention relates.

The present application is generally directed to a mobile device with NFC peer-to-peer capability for securely authenticating the mobile device with an NFC reader device. FIG. 1 illustrates a schematic block diagram of an exemplary system 100, which may be an access control system, a payment system, or any other system that uses a credential or unique identifier. The system 100 includes a mobile device 102 with a transceiver 104 that allows the mobile device 102 to communicate data with another device. In the embodiment shown in FIG. 1, the mobile device is a mobile phone such as a smartphone. In some embodiments, the transceiver 104 is an NFC transceiver that allows the mobile device 102 to operate in an NFC peer-to-peer mode. Furthermore, in some embodiments, the transceiver 104 is a passive device, while in other embodiments the transceiver 104 is an active device. The mobile device 102 includes an application 106 that processes data related to authenticating the mobile device 102 over an NFC peer-to-peer connection. It is contemplated that the mobile device 102 may be a contactless smartcard, or any other device that can communicate secure data 103. It is contemplated that the application 106 may include more than one application to carry out the various operations described in the present application.

The system 100 also includes a reader device 108. The reader device 108 may be a reader, a lock, a payment terminal, and/or any other type of device that is configured to communicate with a mobile device 102 to receive a credential or secure data 103 for processing. In the embodiment shown in FIG. 1, the reader device 108 is an electronic lock with an NFC reader. The reader device 108 may include a transceiver 110 that allows the mobile device 102 and the reader device 108 to communicate with one another. In some embodiments, the transceiver 110 is an NFC transceiver that allows the mobile device 102 and the reader device 108 to communicate over an NFC peer-to-peer connection. NFC peer-to-peer devices, such as the mobile device 102 and the reader device 108 may push or beam various forms of clear-text data, which is not secure, between them. The reader device 108 also includes an application 112 that processes data related to authenticating the mobile device 102 over an NFC peer-to-peer connection. It is contemplated that the application 106 may include more than one application to carry out the various operations described in the present application.

It is contemplated that in other embodiments, the mobile device 102 and the reader 108 may communicate using a different proximity-based wireless technology in addition to and/or instead of NFC such as Bluetooth Low Energy, as one example.

NFC generally supports three types of interaction: reader/writer, peer-to-peer, and card emulation. Reader/writer mode is generally a mode in which an NFC-enabled device may read information from an NFC tag/card, and write information to a NFC tag/card. Peer-to-peer mode is generally a mode for device-to-device communication for sharing data and may be referred to as beaming. Card emulation mode is generally a mode in which a credential or other data is stored on a mobile device and the credential or other data is then read from the mobile device by a reader via NFC.

To implement an NFC peer-to-peer mode or beaming, the present application may utilize, for example, the Android NFC Data Exchange Format (NDEF) Push Protocol (NPP) and/or the NFC Simple NDEF Exchange protocol (SNEP). Aspects of the present application may utilize the ISO/IEC 18092 NFC IP-1 and ISO/IEC 14443 standards as well as the Logical Link Control Protocol to support peer-to-peer communication between two NFC-enabled devices (e.g., mobile device 102 and reader device 108).

The Simple NDEF Exchange Protocol (SNEP) generally is a request/response protocol. An SNEP client sends a request to a SNEP server in the form of a protocol version, a request method, the length of an information field in octets, and an information field. The SNEP server performs the action indicated by the request method using the information provided, and then responds with a message containing a protocol version, a status code indicating success or failure of the method invocation, the length of an information field in octets, and an information field.

Typically, the use of the Simple NDEF Exchange Protocol is to exchange NDEF messages. NDEF messages are transmitted in the information field of SNEP request or response messages. Generally, the maximum possible length of any NDEF message to be transmitted is 232-1 (i.e., the largest integer that can be encoded in the SNEP request or response header length field).

The NFC Data Exchange Format (NDEF) specification is generally a common data format for NFC Forum Devices and NFC Forum Tags. The NDEF specification generally defines the NDEF data structure format as well as rules to construct a valid NDEF message as an ordered and unbroken collection of NDEF records. Furthermore, the NDEF specification defines the mechanism for specifying the types of application data encapsulated in NDEF records.

The NDEF specification defines the data structure format to exchange application or service specific data in an interoperable way, and the NDEF specifically generally does not define any record types. Detail-record types may be defined in separate specifications. One example of the use of NDEF is when two NFC Forum Devices are in proximity, an NDEF message is exchanged over the NFC Forum LLCP protocol. When an NFC Forum Device is in proximity of an NFC Forum Tag, an NDEF message is retrieved from the NFC Forum Tag by means of the NFC Forum Tag protocols. The data format of the NDEF message is the same in these two cases so that an NFC Forum Device may process the NDEF information independent of the type of device or tag with which the NFC Forum Device is communicating.

In the NFC Forum architecture, the SNEP generally is a protocol layer on top of the Logical Link Control Protocol (LLCP). LLCP generally provides a connection-oriented transport service with sequenced and guaranteed delivery of service data units where each service data unit can accommodate at least 128 octets. An LLCP connection-oriented transport is established between a local and a remote LLC service access point and termed data link connection.

SNEP messages are generally transmitted over LLCP data link connections using LLCP connection-oriented transport service. An active SNEP server generally awaits connect requests on an LLC service access point. The address of that service access point is typically specified in the connect request originating from the client (note that LLCP also allows a data link connection to be established by specifying a service name in a connect request sent to the service discovery component). Once a data link connection is established, the client typically only sends SNEP request messages and the server typically only sends return SNEP response messages on that data link connection. The client closes the data link connection when the conversation is finished.

In FIG. 1, the system 100 further includes a server 114 that communicates with the mobile device 102 over the Internet, a cellular data network, or any combination thereof. The server 114 may provide the application 106 and/or the secure data 103 to the mobile device 102. In the embodiment shown in FIG. 1, the server 114 is a web server. It is contemplated that the server 114 may be another type of server and that the server 114 may include more than one server. In addition, it is contemplated that the server 114 may include two or more servers that are owned and/or operated by separate entities.

The mobile device 102 is configured to send secure data 103 to the reader device 108, which verifies the secure data 103. In some embodiments, the reader device 108 is configured to send the secure data 103, if verified, to a processing system 116. The processing system 116 may include an access control panel, a payment processing system, or any other system that uses a credential or unique identifier. For example, the processing system 116 processes the secure data to determine whether a user of the mobile device 102 should be allowed access to an area, or whether a payment has been approved. In some embodiments, the reader device 108 performs the analysis and may make the decision that is handled by the processing system 116.

Figure 2:
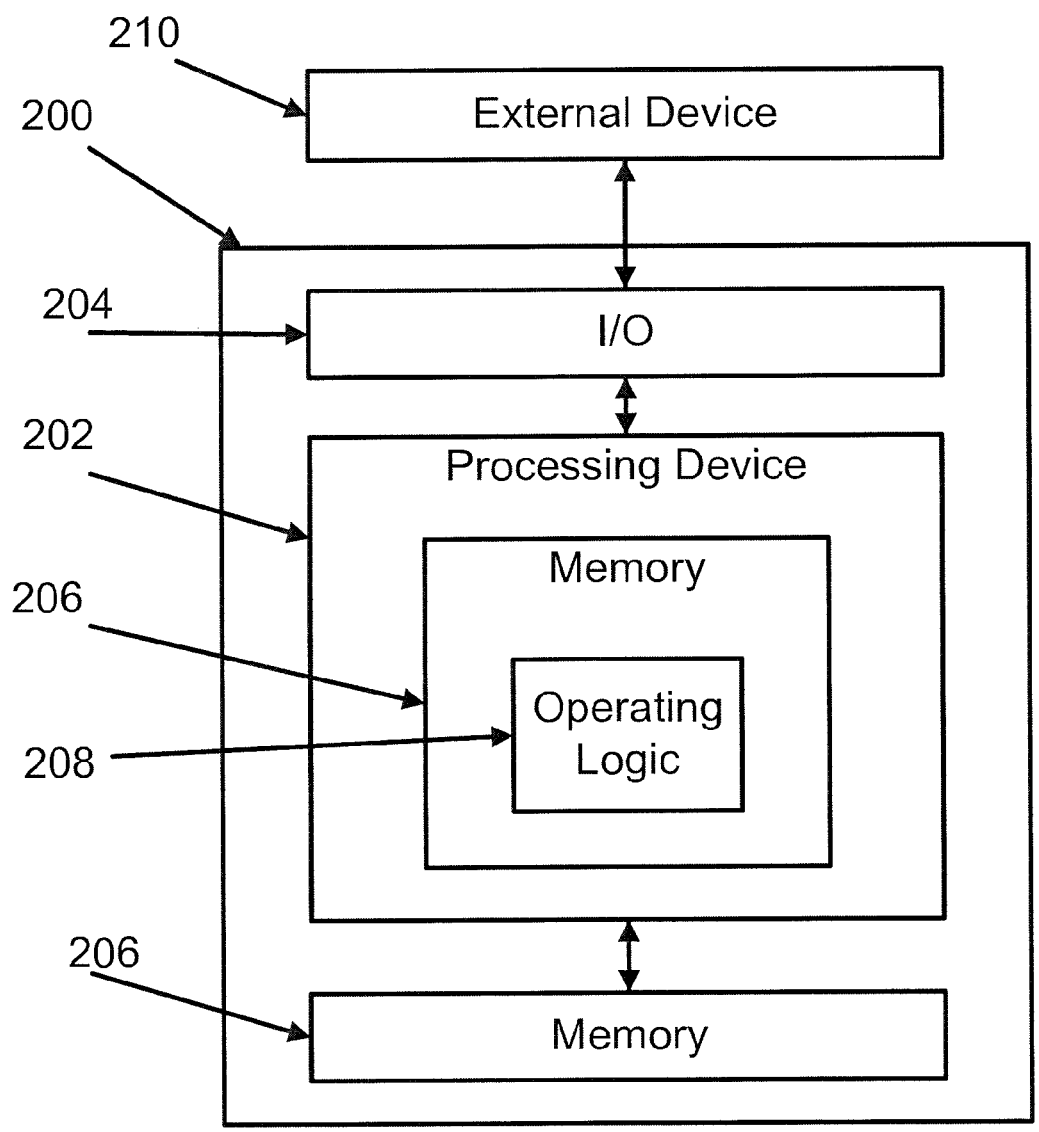
FIG. 2 is a schematic block diagram of an exemplary computing device.

FIG. 2 is a schematic block diagram of a computing device 200. The computing device 200 is one example of a mobile device, reader device, server, and/or processing system configuration that may be utilized in connection with the mobile device 102, reader device 108, server 114, and/or processing system 116 shown in FIG. 1. Computing device 200 includes a processing device 202, an input/output device 204, memory 206, and operating logic 208. Furthermore, computing device 200 communicates with one or more external devices 210.

The input/output device 204 allows the computing device 200 to communicate with the external device 210. For example, the input/output device 204 may be a transceiver, network adapter, network card, interface, or a port (e.g., a USB port, serial port, parallel port, an analog port, a digital port, VGA, DVI, HDMI, FireWire, CAT 5, or any other type of port or interface). The input/output device 204 may be include hardware, software, and/or firmware. It is contemplated that the input/output device 204 will include more than one of these adapters, cards, or ports.

The external device 210 may be any type of device that allows data to be inputted or outputted from the computing device 200. For example, the external device 210 may be a mobile device, a reader device, equipment, a handheld computer, a diagnostic tool, a controller, a computer, a server, a processing system, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

Processing device 202 can be a programmable type, a dedicated, hardwired state machine, or any combination of these. The processing device 202 may further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 may include one or more components of any type suitable to process the signals received from input/output device 204 or elsewhere, and to provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
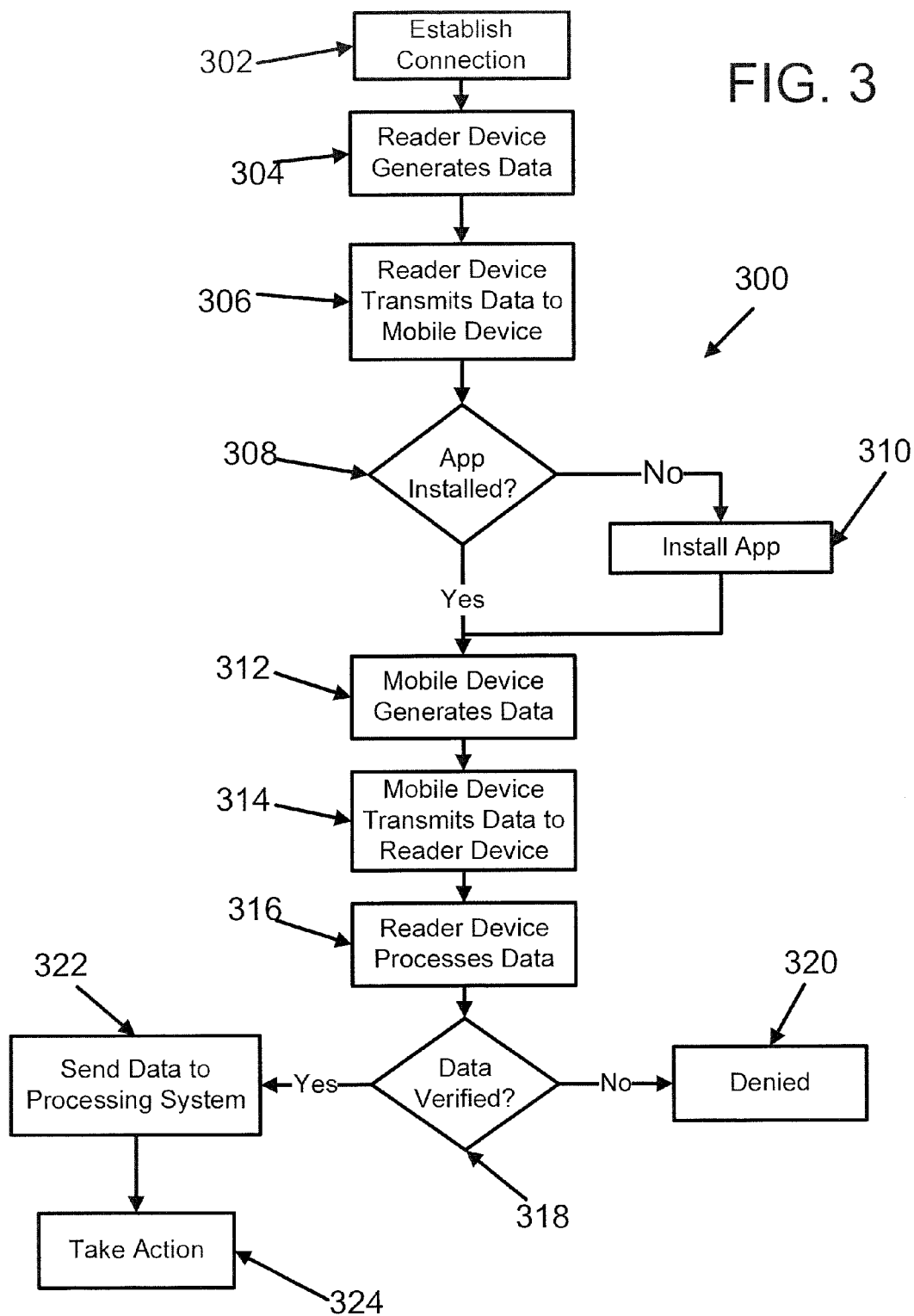
FIG. 3 is a schematic flow diagram of an exemplary process for securely authenticating a mobile device with a reader device.

FIG. 3 illustrates a schematic flow diagram of an exemplary process 300 for securely authenticating a mobile device with a reader device. Operations illustrated for all of the processes in the present application are understood to be examples only, and operations may be combined or divided, and added or removed, as well as re-ordered in whole or in part, unless explicitly stated to the contrary.

The process 300 begins at operation 302 in which the mobile device 102 and the reader device 108 establish a connection with one another. Generally, the peer-to-peer communication mode is a passive communication mode where the reader device 108 may be the initiator and is generating the radio frequency (RF) field for passive NFC communication. The mobile device 102 may be the target and responds to an initiator command in a load modulation scheme. Thus, the reader device 108 may act as a "client" in peer-to-peer mode polling and/or periodically searching for a "server," such as a mobile device 102. Generally, the initiator is the generator of the RF field and starter of the NFCIP-1 communication where the target responds to the initiator command(s) using a load modulation scheme (i.e., RF field generated by the initiator). Furthermore, it is contemplated that in some embodiments, establishing a connection may include placing the mobile device 102 in proximity to the reader device 108.

The process 300 then proceeds to operation 304. At operation 304, the application 112 on the reader device 108 generates an identifier, such as a session identifier, and appends the identifier to a uniform resource identifier (URI). The URI may include a uniform resource locator (URL), such as a web address, to the server 114.

The process 300 then proceeds from operation 304 to operation 306. At operation 306, the reader device 108 transmits the session identifier and the URI as an NDEF message to the transceiver 110 of the mobile device 102 using the NFC peer-to-peer connection.

The process 300 then proceeds from operation 306 to operation 308. At operation 308, the mobile device 102 receives the NDEF message including the session identifier and the URI, and determines whether the application 106 is installed on the mobile device 102. If the application 106 is installed on the mobile device 102, the process 300 proceeds from operation 308 to operation 312.

Figure 4:
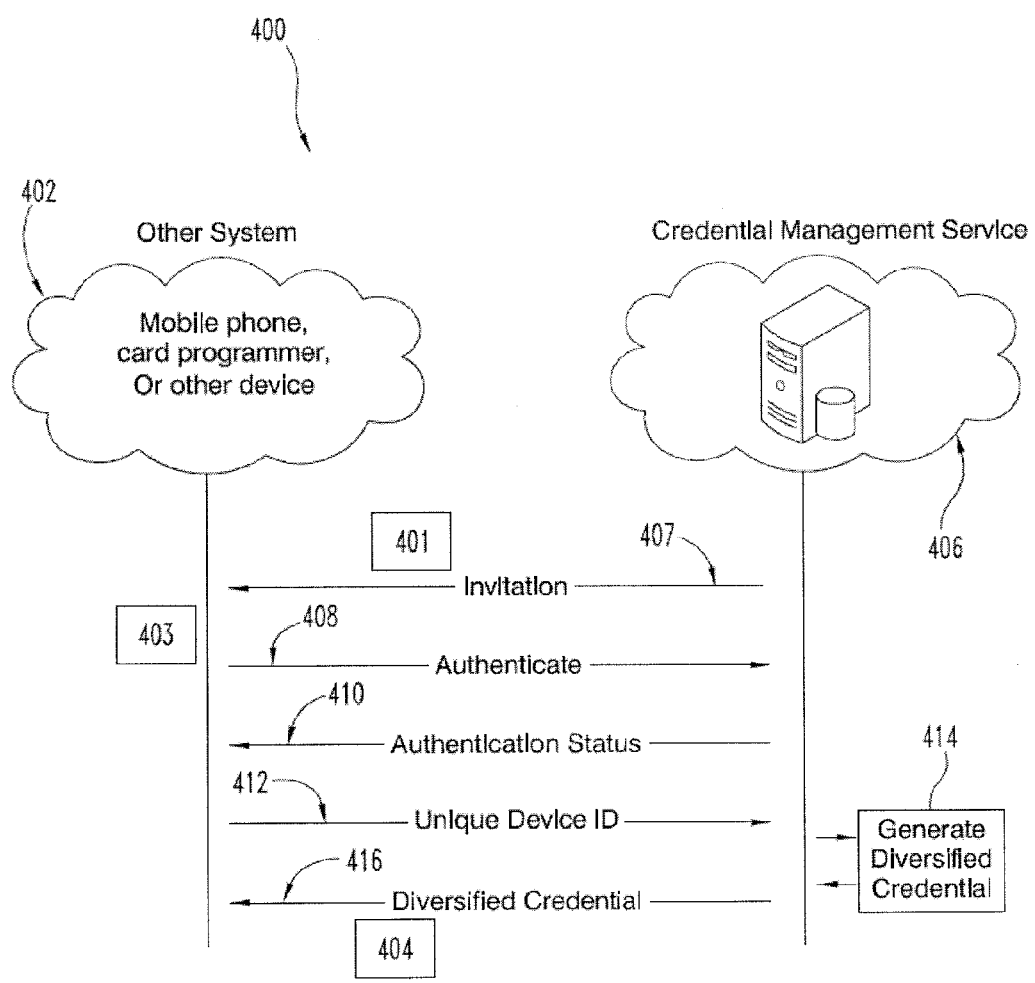
FIG. 4 is a schematic flow diagram of an exemplary process for downloading secure data from a server and storing the secure data on a mobile device.

If the application 106 is not installed on the mobile device 102, the process 300 proceeds to operation 310 where the mobile device 102 may use the URI to download and install the application 106 from the server 114. In addition, a web browser on the mobile device 102 may present a web page using the URI. The web page may include product information, an explanation of how the application 106 operates, and/or instructions for downloading the application 106. Once the application 106 is installed, the mobile device 102 may enroll the application in order to download the credential 103 from server 114. FIG. 4 illustrates an exemplary process 400 for downloading and/or storing a credential on a mobile device 102. After the application 106 is installed on the mobile device 102, the process 300 proceeds to operation 312.

At operation 312, the application 106 may read the URI and validate the URI or a URL in the URI. The application 106 on the mobile device 102 may encrypt the session identifier, secure data 103, and a unique device identifier (e.g., a phone ID or a registered device ID, which may be similar to a MIFARE UID) with a symmetric key or a device diversified symmetric key. The secure data 103 may include a credential, a unique number, payment information, the facility code and badge identifier, and/or any other type of secret information that may be used in an access control system, payment system, or any other similar type of system. In addition, the credential may be a virtual credential that is a credential created with software and delivered to an end user electronically. The virtual credential may be in the format of a complete MIFARE sector, and for peer-to-peer mode, the credential may be excluding the trailer sector.

It is contemplated that the secure data 103 may already be encrypted when the secure data 103 is downloaded from the server 114 and stored on the mobile device 102. Thus, there may be two layers of encryption with respect to the secure data 103 because the secure data 103 may encrypted and then the session identifier, the encrypted secure data 103, and the unique device identifier are also encrypted as a payload or data.

In addition, in some embodiments, the secure data 103 may be stored in memory in the mobile device 102 that is used for storing application data in which that memory does not have to be a secure element because the secure data 103 is encrypted.

The process 300 then proceeds from operation 312 to operation 314. The reader device 108 may switch from being a "client" to a "server," and the mobile device 102 may switch from being a "server" to a "client." At operation 314, the application 106 on the mobile device 102 transmits, beams, and/or pushes, via the transceiver 104, the encrypted payload (session identifier, secure data 103, unique device identifier) along with the unique device identifier (unencrypted) to the reader device 108. It is contemplated that a user may interact with the mobile device 102 to effectuate the beaming of the encrypted payload from the mobile device 102 to the reader device 108.

The process 300 then proceeds from operation 314 to operation 316. At operation 316, the reader device 108 receives the data (e.g., the encrypted payload), via transceiver 110, from the mobile device 102. The application 112 may validate that the received data is a well-formed NDEF message. The application 112 may unpack the unique device identifier from the NDEF message. The application 112 on the reader device 108 may decrypt the payload using a symmetric key or a device diversified symmetric key, and/or the unique device identifier. It is contemplated that the payload and/or the NDEF message may include other data than that described above.

The process 300 then proceeds from operation 316 to operation 318. At operation 318, the application 112 on the reader device 108 verifies that the session identifier received from the mobile device 102 matches or corresponds to the session identifier that was sent to the mobile device 102. The application 112 also verifies that copies of the unique device identifier received from the mobile device 102 match or correspond to one another. In some embodiments, the session identifiers correspond to one another if they are identical. In other embodiments, the session identifiers may not be identical, but still correspond to one another such as being sequential numbers or otherwise relate to one another.

If either the session identifiers or the device identifiers do not correspond to one another, the process 300 proceeds from operation 318 to operation 320 because the authentication has failed. The service being requested is effectively denied because of the failed authentication as secure data is not passed to the processing system 116. It is contemplated that an illuminated indicator, an audio sound, or a message may be presented or transmitted to notify the user of the mobile device 102 that the authentication failed.

If the session identifiers and the device identifiers do correspond to one another, the process 300 proceeds from operation 318 to operation 322. At operation 322, the reader device 108 transmits the secure data 103 to the processing system 116. Before transmitting the secure data 103 to the processing system 116, the application 112 may decrypt the secure data 103 with a private master key. The processing system 116 processes the secure data 103 to determine, for example, whether the mobile device 102 may access an area or whether a payment should be allowed. The processing system 116 sends a response back to the reader device 108 indicating the action that the reader device 108 should take. As discussed above, in some embodiments, the reader device 108 performs the analysis and may make the decision that is handled by the processing system 116.

The process 300 then proceeds from operation 322 to operation 324. At operation 324, the reader device 108 takes the action indicated by the processing system 116. For example, if the reader device 108 is an electronic lock with an NFC reader, the reader device 108 will open the lock. As another example, if the reader device 108 is a payment terminal, the reader device 108 will accept the payment and complete the transaction. Other types of reader devices and use cases are contemplated.

FIG. 4 illustrates an exemplary schematic flow diagram of a process 400 for downloading secure data from a server and storing the secure data on a mobile device. For example, a mobile device 402 (e.g., the mobile device 102) may download a virtual credential 404 (e.g., secure data 103) from a cloud credential management service 406 (e.g., server 114). Operations illustrated are understood to be exemplary only, and operations may be combined or divided, and added or removed, as well as re-ordered in whole or in part.

Process 400 begins at operation 407 in which the cloud credential management service 406 transmits an invitation 401 to the mobile device 402. The invitation 401 may be an email, a push notification, and/or a text message. The invitation 401 is processed by an application 403 in the mobile device 402. The invitation 401 includes a uniform resource identifier (URI) that includes a uniform resource locator (URL) to the cloud credential management service 406 for downloading the credential 404.

The cloud credential management service 406 may transmit the invitation 401 to mobile device 402 in response to receiving a credential request from a customer. The information in the credential request from the customer may be stored in a database in the cloud credential management service 406. It is contemplated that the invitation 401 may come from a customer and not the cloud credential management service 406.

Process 400 then proceeds from operation 407 to operation 408. At operation 408, the mobile device 402 authenticates with the cloud credential management service 406 by the application 403 (e.g., application 106) using the URL in the invitation 401. The URL may include arguments in a query string such as a user ID, PIN, and/or GUID. The user ID may be an email address. The PIN may be a password. For example, the mobile device 402 connects to the cloud credential management service 406 using a Hypertext Transfer Protocol Secure (HTTPS) connection, which uses Secure Sockets Layer (SSL).

Process 400 then proceeds from operation 408 to operation 410. At operation 410, upon receiving an acceptable user ID and PIN (such as by comparing the received user ID and PIN to the ones received in the database in the cloud credential management service 406), the cloud credential management service 406 sends an authentication status, which may include a token, to the mobile device 402. Once the device 402 has been authenticated, the communications between the device 402 and the cloud credential management service 406 may occur over secure sockets, such as using secure sockets layer (SSL), over the Internet.

Process 400 then proceeds from operation 410 to operation 412. At operation 412, the device 402 then sends a unique device identifier to the credential management service 406 along with the token. It is contemplated that in some embodiments, the token is not sent. The unique device ID may be the serial number or unique number of the mobile device 102 or of the transceiver 104 that is part of the mobile device 402 (e.g., mobile device 102).

Process 400 then proceeds from operation 412 to operation 414. At operation 414, the credential management service 406 then generates a unique diversified credential 404 using the unique device identifier that is hashed using a master key (e.g., a 128-bit AES key). The master key may be a symmetric key. It is contemplated that the diversified credential 404 may include an encryption key.

Process 400 then proceeds from operation 414 to operation 416. At operation 416, the unique diversified credential 404 is then sent from the cloud credential management service 406 to the mobile device 402. For example, the cloud credential management service 406 may encrypt the credential 404 using a diversified master key that is based on the unique device identifier. The diversification method may be the DESFire EV1 method. The encrypted credential may be encapsulated in a package such as a JavaScript Object Notation (JSON) object, an XML-format message to the mobile device 402, or the like. The cloud credential management service 406 may then transmit the package to the mobile device 402.

Generally, the application 403 on the mobile device 402 receives and unpackages the credential 404 from the JSON, XML, or another type of message. The mobile device 402 may store the encrypted credential 404 in the memory used for storing application data, which does not have to be a secure element. However, it is contemplated that in some embodiments, the credential 404 is stored in a secure element. The mobile device 402 may then use the unique diversified credential 404 for access control, payment, transit, vending, or any other application as described with respect to process 300 illustrated in FIG. 3. Generally, with this method of delivery, credentials 404 can be securely programmed onto cards, phones, and other devices remotely, rather than with a card programmer.

The various aspects of the process 300 and/or 400 in the present application may be implemented in operating logic 208 as operations by software, hardware, artificial intelligence, fuzzy logic, or any combination thereof, or at least partially performed by a user or operator. In certain embodiments, operations represent software elements as a computer program encoded on a computer readable medium, wherein the mobile device 102, reader device 108, server 114, and/or processing system 116 performs the described operations when executing the computer program.

One embodiment of the present application includes a method, comprising, generating a first identifier with a reader device; transmitting the first identifier to a mobile device; receiving, with the reader device, encrypted data and unencrypted data from the mobile device, wherein the encrypted data includes at least a second identifier; evaluating, with the reader device, whether at least a portion of the encrypted data and at least a portion of the unencrypted data correspond to one another; and evaluating, with the reader device, whether the first identifier and the second identifier correspond to one another.

Additional features of this embodiment of the present application may include: wherein the first identifier and the second identifier correspond to one another if they are identical; wherein the portion of the encrypted data and the portion of the unencrypted data is a device identifier; wherein the encrypted data includes a secure data; transmitting, with the reader device, the secured data to a processing system; wherein the processing system is one of an access control system and a payment system; and/or wherein the reader device and the mobile device communicate with one another via a NFC peer-to-peer mode.

Another embodiment of the present application includes a method, comprising, receiving, with a mobile device, a first identifier from a reader device; generating, with the mobile device, a data packet including the first identifier, secure data, and a device identifier; encrypting the data packet with the mobile device; and transmitting, with the mobile device, the encrypted data packet and the device identifier unencrypted to the reader device.

Additional features of this embodiment of the present application may include: wherein the first identifier is a session identifier; and/or wherein the reader device and the mobile device communicate with one another via an NFC peer-to-peer mode.

Another embodiment of the present application includes a system, comprising, a reader device configured to generate a first identifier; and a mobile device configured to receive the first identifier from the reader device, the mobile device is further configured to generate an encrypted data packet that includes a second identifier, secure data, and a device identifier, the mobile device is further configured to transmit the encrypted data packet and unencrypted data to the reader device, wherein the reader device is further configured to evaluate whether at least a portion of the encrypted data packet and at least a portion of the unencrypted data correspond to one another, wherein the reader device is further configured to evaluate whether the first identifier and the second identifier correspond to one another.

Additional features of this embodiment of the present application may include: a processing device configured to receive the secure data from the reader device when the portion of the encrypted data packet and the portion of the unencrypted data are the same and when the first identifier and the second identifier are the same; wherein the first identifier and the second identifier are a session identifier; and/or wherein the reader device and the mobile device communicate with one another via an NFC peer-to-peer mode.

One aspect of the present application includes a method, comprising: receiving a notification with a mobile device; utilizing, with the mobile device, information in the notification to request a server to generate a credential; receiving, with the mobile device, a package from the server; extracting the credential from the package; and storing the credential in a memory of the mobile device.

Features of the aspect of the present application may include: wherein the notification is at least one of an email, a text message, and a push notification; wherein the package is at least one of a JSON object and an XML-formatted message; decrypting the credential before storing the credential in the memory, wherein the memory is a secure element; wherein the information includes a uniform resource locator; authenticating the mobile device with the server based on an argument string in the URL; wherein the mobile device is a mobile phone; wherein the credential is encrypted and wherein the memory is not a secure element.

Another aspect of the present application may include a system, comprising: a server configured with non-transitory computer executable instructions to generate a credential based on a unique device identifier and a master key, to encrypt the credential, and to encapsulate the encrypted credential in a package; and a mobile device in communication with the server, wherein the mobile device is configured with non-transitory computer executable instructions to authenticate with the server, to transmit the unique device identifier to the server, and to download the package from the server.

Features of the aspect of the present application may include: wherein the mobile device comprises a NFC communication module configured to transmit at least a portion of the credential to a NFC communication module of a reader device; wherein the reader device includes a secure access module to store a reader key; wherein the system is one of an access control system, a payment system, a transit system, and a vending system; wherein the mobile device is a mobile phone.

Another aspect of the present application may include a method, comprising: generating a first identifier with a reader device; transmitting the first identifier to a mobile device; receiving, with the reader device, encrypted data and unencrypted data from the mobile device, wherein the encrypted data includes at least a second identifier; and evaluating, with the reader device, whether the first identifier and the second identifier correspond to one another.

Features of the aspect may include one or more of the following: wherein the first identifier and the second identifier correspond to one another if they are identical; wherein the portion of the encrypted data and the portion of the unencrypted data is a device identifier; decrypting, with the reader device, the encrypted data using the device identifier; wherein the encrypted data includes a secure data; decrypting, with the reader device, the secure data to provide a credential; and transmitting, with the reader device, the credential to a processing system, wherein the processing system is one of an access control system and a payment system; wherein the reader device and the mobile device communicate with one another via near field communication; wherein the near field communication includes an NFC peer-to-peer mode; wherein the reader device and the mobile device communicate with one another via Bluetooth.

Yet another aspect of the present application may include method, comprising: receiving, with a smartphone, a package from a server; extracting, with the smartphone, a credential from the package; storing the credential in a memory of the smartphone; receiving, with the smartphone, a first identifier from a reader device; generating, with the smartphone, a payload including the first identifier, the credential, and a second identifier; encrypting the payload with the smartphone; and transmitting, with the smartphone, the encrypted payload and the second identifier unencrypted to the reader device.

Features of the aspect may include one or more of the following: wherein memory is not a secure element; wherein the credential is encrypted; receiving, with the smartphone, a uniform resource identifier from the reader device, wherein the uniform resource identifier includes a uniform resource locator directed to web page, wherein the web page includes information for downloading an application onto the smartphone; wherein the first identifier is a session identifier and the second identifier is a device identifier; wherein the reader device and the smartphone communicate with one another via an NFC peer-to-peer mode; wherein the reader device and the smartphone communicate with one another via Bluetooth.

Another aspect of the present application may include a system, comprising: a server configured with non-transitory computer executable instructions to generate a credential and generate a package that includes the credential; a reader device configured with non-transitory computer executable instructions to generate a session identifier; and a mobile device configured with non-transitory computer executable instructions to receive the package from the server, extract the credential from the package, store the credential in a memory of the smartphone that is not a secure element, receive the session identifier from the reader device, generate a payload including the session identifier and the credential, and transmit the payload to the reader device.

Features of the aspect may include one or more of the following: a processing device configured with non-transitory computer executable instructions to receive the credential from the reader device and determine whether one of an access request and a payment request should be granted; wherein the reader device and the mobile device communicate with one another via an NFC peer-to-peer mode; wherein the reader device and the mobile device communicate with one another via Bluetooth.

While the invention has been described in connection with what is presently considered to be the preferred embodiment, it is to be understood that the invention is not to be limited to the disclosed embodiment(s), but on the contrary, is intended to cover various modifications and equivalent arrangements. Furthermore it should be understood that while the use of the word "preferable," "preferably," or "preferred" in the description above indicates that feature so described may be more desirable, it nonetheless may not be necessary and any embodiment lacking the same may be contemplated as within the scope of the invention. Further, when the language "at least a portion" and/or "a portion" is used the item may include a portion and/or the entire item unless specifically stated to the contrary.

What is claimed is:

1. A method, comprising:
   generating a first identifier with a reader device;
   transmitting the first identifier to a mobile device, wherein the first identifier is appended to a uniform resource identifier;
   receiving, with the mobile device, an encrypted package from a server that is identified by the uniform resource identifier;
   encrypting, with the mobile device, a credential extracted from the encrypted package received from the server, wherein the credential is encrypted by the mobile device with the first identifier and with a second identifier that is unique to the mobile device, wherein the credential is a unique diversified credential that is diversified using a DESFire EV1 method and includes a diversified master key based on the second identifier unique to the mobile device;
   receiving, with the reader device, the encrypted data and unencrypted data from the mobile device, wherein the encrypted data and the unencrypted data each include at least the second identifier that identifies the mobile device; and
   evaluating, with the reader device, whether the first identifier in the encrypted data corresponds to the first identifier transmitted to the mobile device and whether the second identifier in the unencrypted data corresponds to the second identifier in the encrypted data.

2. The method of claim 1, wherein the first identifier in the encrypted data and the first identifier that is generated by the reader device correspond to one another if they are identical.

3. The method of claim 1, wherein the reader device validates whether the encrypted data from the mobile device is NFC data exchange format.

4. The method of claim 1, wherein the encrypted data includes a secure data, wherein the secure data includes the credential and a payment information.

5. The method of claim 4, further comprising:
   decrypting, with the reader device, the secure data to provide the credential; and
   transmitting, with the reader device, the credential to a processing system, wherein the processing system is a payment system.

6. The method of claim 1, wherein the encrypted data includes a secure data, wherein the secure data includes the credential and a facility code.

7. The method of claim 6, further comprising:
   decrypting, with the reader device, the secure data to provide the credential; and
   transmitting, with the reader device, the credential to a processing system, wherein the processing system is an access control system.

8. The method of claim 1, wherein the reader device and the mobile device communicate with one another via near field communication.

9. The method of claim 8, wherein the near field communication includes an NFC peer-to-peer mode.

10. The method of claim 1, wherein the reader device and the mobile device communicate with one another via a proximity based wireless technology.

11. A method, comprising:
    receiving, with a smartphone, an encrypted package from a server;
    extracting, with the smartphone, a credential from the encrypted package, wherein the credential is a unique diversified credential that is diversified using a DESFire EV1 method and includes a diversified master key based on a unique identifier of the smartphone;
    storing the credential in a memory of the smartphone;
    receiving, with the smartphone, a first identifier from a reader device;
    generating, with the smartphone, a payload including the first identifier, the credential, and a second identifier that identifies the smartphone, wherein the second identifier corresponds to the unique identifier of the smartphone;
    encrypting the payload including the first identifier, the credential and the second identifier with the smartphone; and
    transmitting, with the smartphone, the encrypted payload and an unencrypted one of the second identifier to the reader device.

12. The method of claim 11, wherein the memory is not a secure element.

13. The method of claim 11, further comprising:
    receiving, with the smartphone, a uniform resource identifier from the reader device, wherein the uniform resource identifier includes a uniform resource locator directed to a web page, wherein the web page includes information for downloading an application onto the smartphone.

14. The method of claim 11, wherein the first identifier is a session identifier.

15. The method of claim 11, wherein the reader device and the smartphone communicate with one another via an NFC peer-to-peer mode.

16. The method of claim 11, wherein the reader device and the smartphone communicate with one another via a proximity based wireless technology.

17. A system, comprising:
- a server configured with non-transitory computer executable instructions to generate a credential and generate an encrypted package that includes the credential;
- a reader device configured with non-transitory computer executable instructions to generate a session identifier and append the session identifier to a uniform resource identifier; and
- a mobile device configured with non-transitory computer executable instructions to receive the session identifier and the uniform resource identifier from the reader device to communicate with the server and to receive the encrypted package from the server, extract the credential from the package, store the credential in a memory of the smartphone that is not a secure element, generate an encrypted payload including the session identifier and the credential along with a unique device identifier for the mobile device, and transmit the encrypted payload to the reader device with an unencrypted one of the unique device identifier, wherein the credential is a unique diversified credential that is diversified using a DESFire EV1 method and includes a diversified master key based on the unique device identifier for the mobile device.

18. The system of claim 17, further comprising:
- a processing device configured with non-transitory computer executable instructions to receive the credential from the reader device and determine whether one of an access request and a payment request should be granted.

19. The system of claim 17, wherein the reader device and the mobile device communicate with one another via an NFC peer-to-peer mode.

20. The system of claim 17, wherein the reader device and the mobile device communicate with one another via a proximity based wireless technology.

* * * * *